H. P. T. VAN KEUREN.
ENGINE.
APPLICATION FILED AUG. 18, 1913.
1,225,376.
Patented May 8, 1917
3 SHEETS—SHEET 3.
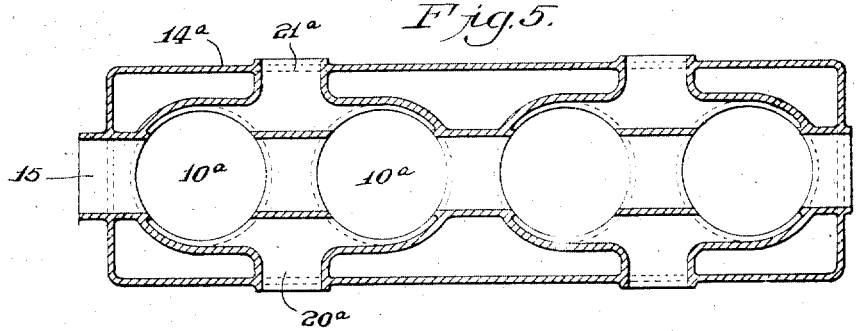
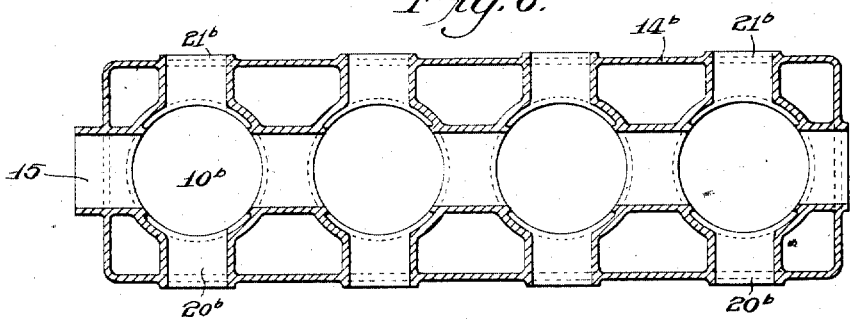
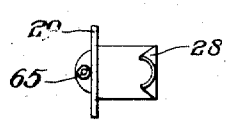
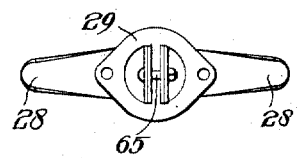
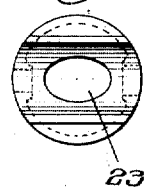
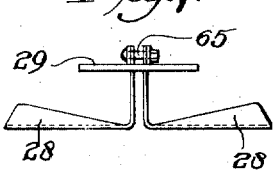
INVENTOR
Henry P. T. Van Keuren
BY
ATTORNEY
WITNESSES

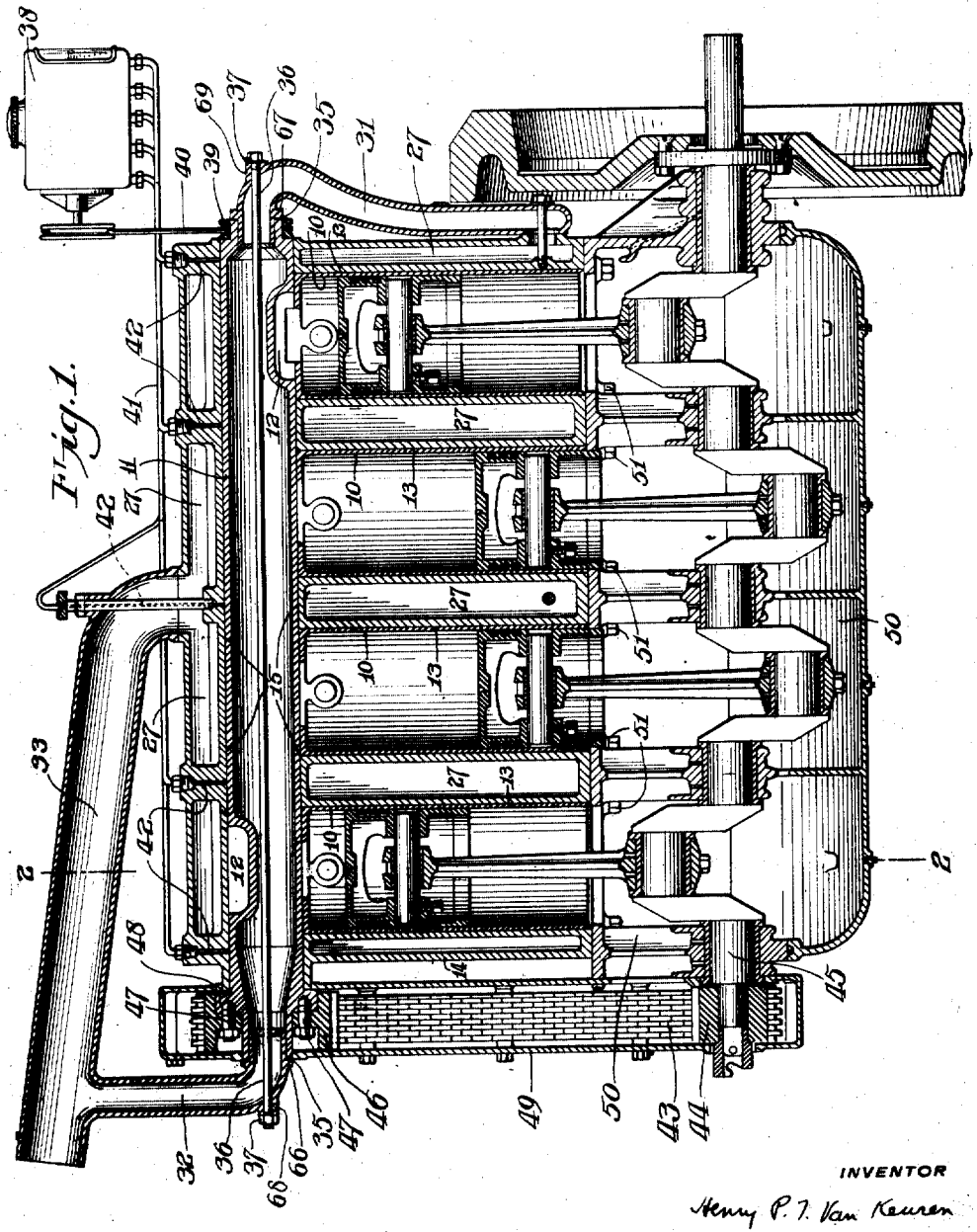

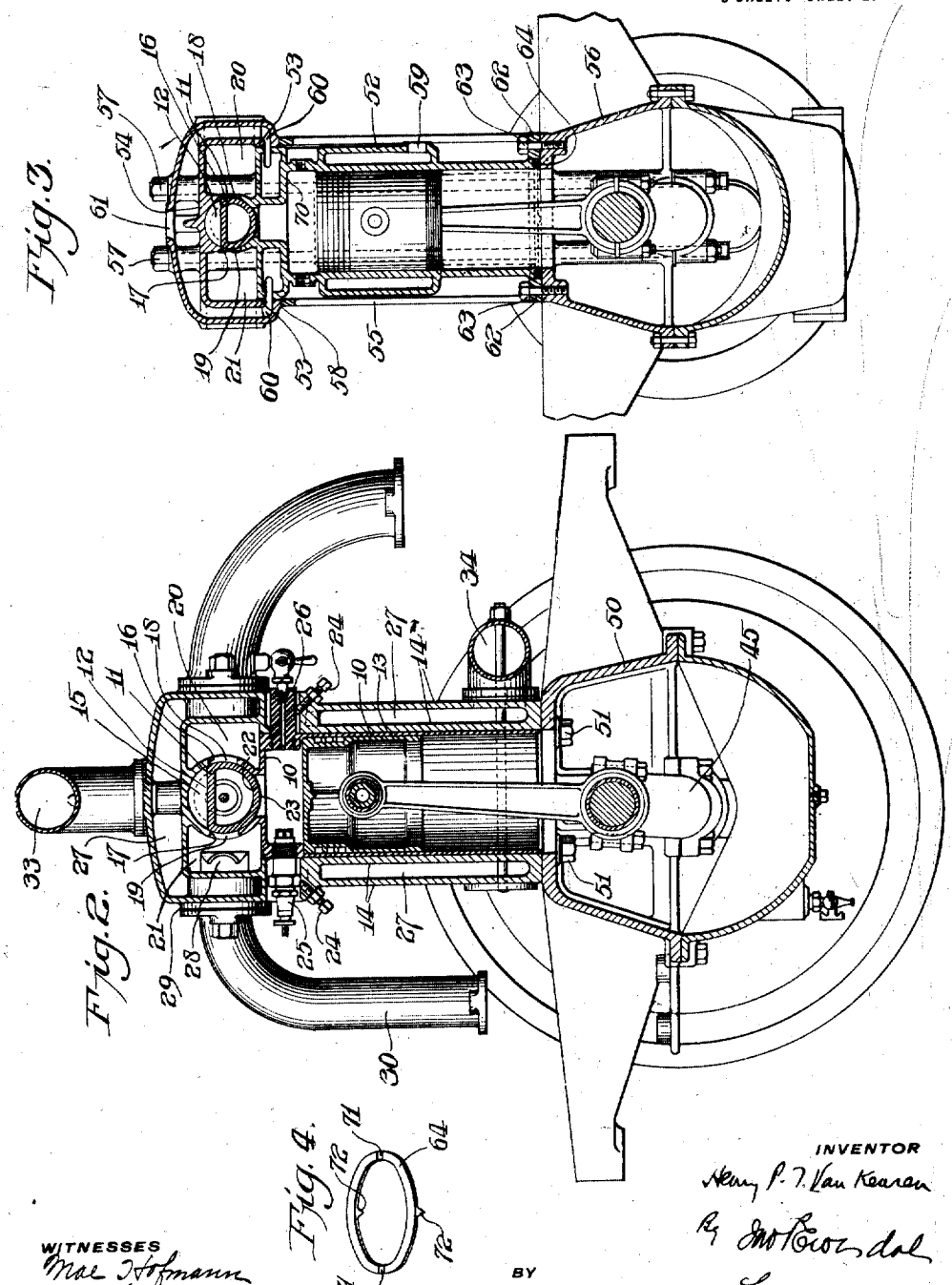

UNITED STATES PATENT OFFICE.

HENRY P. T. VAN KEUREN, OF PHILADELPHIA, PENNSYLVANIA.

ENGINE.

1,225,376.   Specification of Letters Patent.   Patented May 8, 1917.

Application filed August 18, 1913. Serial No. 765,267.

*To all whom it may concern:*

Be it known that I, HENRY P. T. VAN KEUREN, a citizen of the United States, residing at Philadelphia, in the county of Philadelphia, State of Pennsylvania, have invented a new and useful Engine, of which the following is a specification.

My invention relates to improvements in internal combustion engines and more especially to improvements upon my rotary valve engine as set forth in my co-pending application Serial No. 713,998, filed August 8, 1912. Reference is also made to my co-pending application Serial No. 743,705, filed January 23, 1913.

The object is to provide improved and simplified valve control in engines such as are used in vehicles, nautical and aero-nautical craft.

My invention also comprises improvements in cooling methods, in cylinders and in water jackets, improved gas distributing means and improvements in lubrication and in other details of construction.

Referring to the drawings:

Figure 1 is a vertical longitudinal midsection of a four cylinder, four cycle, water cooled gasolene automobile engine.

Fig. 2 is a transverse vertical section of same on line 2—2 of Fig. 1.

Fig. 3 is a transverse vertical section of a modified form of engine.

Fig. 4 is a perspective view of a flexible collar or spring ring inserted between crank case and cylinder in the construction shown in Fig. 3.

Fig. 5 is a horizontal longitudinal section of a casing through the center line of the valve bore of a further modification.

Fig. 6 is a similar view of an additional modification.

Fig. 7 is a plan view of a baffle plate which may be employed in the intake chamber of the engines shown in Figs. 2 and 3.

Fig. 8 is a side view of same.

Fig. 8ª is an end view of same.

Fig. 9 is a top view of cylinder showing a circular port.

Similar numerals refer to similar parts throughout the several views.

In the constructions shown in the drawings, which are illustrative merely by way of example, of preferred embodiments of my invention, the cylinders are served by rotating valve 11. This valve is in the form of a hollow cylinder and is provided at intervals, both longitudinally and peripherally, with recesses 12 forming passageways for the fresh and spent gases.

In the construction shown in Figs. 1 and 2, cylinders 10 are mere shells of metal made as thin as is consistent with necessary strength to withstand the gas pressures and the handling and methods of manufacture. They are made thin in order to give up or readily transfer heat to the water jacket, to the incoming charge and to the exhaust, as well as for the purpose of securing lightness.

Said cylinders 10 are ground internally to the proper bore of the engine and externally to fit with a slight clearance the ground bores 13 of casing or water jacket casting 14. Casing 14 for ease and cheapness of manufacture and for the sake of rigidity is preferable cast "*en bloc.*"

Casing 14 is provided with a horizontal longitudinal bore 15 in which the valve 11 operates. Bores 13 which receive the cylinders 10 intersect bore 15 which receives the valve. In the process of forming bores 13 an end mill is used which machines upper lips 16 and 17 of exhaust port 18 and intake port 19 leading to exhaust chamber 20 and from intake chamber 21. The lower lips of said ports are formed upon the cylinder heads which are provided with cylindrical bearing surfaces or valve seats 22 pierced by cylinder ports 23.

By this construction cylinder pressures cause the cylinders to move upward a minute distance to a seat upon the rotating valve 11, insuring gas tightness.

Initial adjustment of the cylinders upon the valve in the form shown in Figs. 1 and 2 is secured by set screws 24 which bear against spark plug 25 on the one side and relief cock plug 26 on the other side. Plugs 25 and 26 are screwed into proper threaded recesses in cylinders 10 and hence made rigid therewith.

Water jacket 27 surrounds the cylinders, valve 11 and the intake and exhaust chambers 21 and 20, serving not alone to cool the cylinders and the valve externally but also to raise the temperature of the intake gas and lower that of the exhaust. This feature provides improved carburation. There is also a direct transfer of heat through the cylinder heads since they form portions of the walls of both intake and exhaust chambers.

The set screws 24 bear against plugs 25 and 26 threaded into cylinders 10 near the point of bearing between the cylinders and valve. It will thus be seen that changes of length of the cylinders due to expansion will be effective over a short distance only so far as affects the adjustment between cylinders and valve, and the cylinders will not be caused to bind upon the valve.

For ease of casting in the foundry both intake and exhaust chambers 21 and 20, in the constructions shown in Figs. 1, 2 and 3, are shown as extending along the length of all the cylinders with but one inlet for the intake and one outlet for the exhaust. In such construction, in order that the cylinders may all receive a more nearly uniform charge, a baffle plate 28 may be employed within the intake as shown in Fig. 2.

This baffle plate 28 is shown in detail in Figs. 7, 8 and 8ª. It is formed from sheet metal and comprises the oppositely disposed deflectors 28 held in position by bolt 65 and flange 29 which also forms a gasket between intake pipe 30 and casing 14.

The valve 11 is preferably internally cooled by water constantly passing through it. The water passes through pipe 31 at the rear of the engine, thence to valve 11 and out at its front end through branch 32 of main water jacket outlet pipe 33 and on to the radiator, not shown. Water enters the main water jacket by means of pipes 34.

Since the valve is constantly rotating and its inlet and outlet pipes are stationary I provide the packed joints 35 at the front and rear ends of the valve. Pipes 31 and 32 have a close fit within the ends of valve 11 and are provided respectively with flanges 66 and 67 between which and the ends of the valve the packing is interposed. Pipes 31 and 32 are also provided with annular shoulders 68 and 69 adapted to receive the ends of threaded rod 36 which extends longitudinally through valve 11 and is provided with the nuts 37. It will be apparent that by turning nuts 37 upon rod 36 the pipes 31 and 32 may be slightly moved toward the valve and the packet joints maintained as tight as may be required.

The rotating valve is oiled by means of a forced feed or mechanical oiler 38 which is driven from pulley 39 on the valve by means of belt 40. Oil leads 41 conduct the oil under pressure through oil ducts 42 to the valve at several points along which it may be distributed by herring bone oil grooves cut in its periphery.

A silent chain 43 may be employed to drive the valve and also to drive the magneto and fan. Chain 43 meshes with pinion 44 carried by crank shaft 45 and drives the valve through sprocket 46 which is bolted to the valve by means of studs 47 carried in flange 48, see Fig. 1. The valve is rotated at half the crank shaft speed. It will be obvious that other positive means of valve drive may be employed such as bevel, spiral or worm gearing. The chain is inclosed in casing 49 and is lubricated by oil splashing through the open end of crank case 50.

In addition to the advantages above referred to as arising from the thin cylinders and *bloc* casing construction, it will be noted that the construction is important because of its extreme simplicity and ease and cheapness of manufacture. By carrying the water jacket down to the base of the cylinders and placing the cylinder stud nuts inside the crank case all unnecessary lines are removed from the casing. At the same time, this added length of jacket over that which is commonly used is also of importance where the thermo-siphon method of cooling is employed, in that it allows more freedom for convection currents to be set up in the body of cooling water and thus improves the circulation.

By the employment of circular cylinder ports such as shown at 23 in Fig. 9, lower cost is obtained and by varying the diameter of the port any timing may be secured. The gases also flow through a circular port with less frictional losses than through a port of rectangular shape.

The rotating valve receives, from the cylinders, all cylinder reactions and transmits the same through casing 14 to the crank case 50 by means of cylinder studs 51.

In the construction shown in Fig. 3, cylinder 70 is integral with water jacket casing 52 and fits in ground joint 53 in the upper casting 54 which contains intake chamber 21, exhaust chamber 20, valve 11, etc., as shown in Fig. 2. Casting 54 is secured to crank case 56 by means of bolts 57 which secure it tightly to a seat 58 upon supporting portions 55 of crank case 56. Bolts 57 also pass down through the crank case and form the main bearing bolts. They are designed to take up the entire cylinder reactions.

The cylinder 70 also has a close fit, at its lower end, within the collar 62 held in place by studs 63. This collar serves to aline the cylinders, to preserve an oil tight fit with the crank case and to retain the flexible ring 64.

This ring 64 is interposed between the lower end of the cylinder and the crank case and serves to hold the cylinder to its seat upon the valve. It is provided, on opposite sides, with the slight projections 71 adapted to bear against the lower end of the cylinder and the slight projections 72 adapted to bear against the crank case.

Cooling water passes into the cylinder jackets at 59, through the passages 60 in ground joint 53, around intake and exhaust chambers 21 and 20 and valve 11, and out at 61.

The construction shown in Fig. 3 is especially adapted for a slow speed, heavy duty marine engine in which class of engine the pressures ensuing from the large bore cylinders are very heavy.

In Fig. 5 there is shown a construction of the casing 14ª wherein baffle 28 is omitted and the intake and exhaust chambers 21ª and 20ª are common to a pair of cylinders 10ª only, or are siamesed.

In Fig. 6 there is shown still another construction of the casing wherein intake and exhaust chambers 21ᵇ and 20ᵇ are all separate per cylinder. The field of this arrangement would be where greatest power for a given bore and stroke is desired and highest speeds employed, as in racing engines. The valve is externally cooled more efficiently in this type.

What I claim is:—

1. In an engine, the combination of a stationary housing, a cylinder movably seated therein, a piston operating in the cylinder, a rotatable valve member journaled in the housing and operating in a concave valve seat in the head of the cylinder and positively adjustable means at the cylinder head for maintaining the relative position between the cylinder and the housing.

2. In an engine, the combination of a stationary housing, a cylinder movably seated therein, a piston operating in the cylinder, a rotatable valve member journaled in the housing and operating in a concave valve seat in the head of the cylinder and means at the cylinder head for limiting the relative movement between the cylinder and the housing.

3. In an engine, the combination of a stationary housing, a cylinder movably seated therein, a piston operating in the cylinder, a rotatable valve member journaled in the housing and operating in a concave valve seat in the head of the cylinder and means at the cylinder head for limiting the relative movement between the cylinder and the valve.

4. In an engine, the combination of a stationary housing, a cylinder movably seated therein, a piston operating in the cylinder, a rotatable valve member journaled in the housing and operating in a concave valve seat in the head of the cylinder, and adjustable means at the cylinder head for maintaining the relative position between the cylinder and the housing.

5. In an engine, the combination of a stationary housing, a cylinder movably seated therein, a piston operating in the cylinder, a rotatable valve member journaled in the housing and operating in a concave valve seat in the head of the cylinder and positively adjustable means at the cylinder head for maintaining the relative position between the cylinder and the housing, whereby the pressure of the expanding charge in the cylinder is utilized to make effective the fit between the valve and its seat.

6. In an engine, the combination of a stationary housing, a cylinder movably seated therein, a piston operating in the cylinder, a rotatable valve member journaled in the housing and operating in a concave valve seat in the head of the cylinder, and exhaust and supply chambers formed in the housing between the walls thereof and the cylinder head and adapted to have valve controlled communication with the cylinder.

7. In an engine, the combination of a stationary housing, a cylinder movably fitted therein, a piston operating in the cylinder, a rotatable valve member journaled in the housing and operating in a concave valve seat in the head of the cylinder, exhaust and supply chambers formed in the housing between the walls thereof and the cylinder head and adapted to have valve controlled communication with the cylinder, and a water jacket in the housing surrounding the cylinder and the intake and exhaust chambers.

8. In an engine, the combination of a stationary housing, having a plurality of cylindrical recesses, cylinders movably fitted therein, pistons operating in the cylinders, a rotatable valve journaled in the housing and coöperating with valve-seats in the heads of the cylinders, and rigid means for maintaining said cylinders in required relationship with the housing.

9. In an engine, the combination of a stationary housing, having a plurality of cylindrical recesses, cylinders movably fitted therein, pistons operating in the cylinders, a rotatable valve journaled in the housing and coöperating with valve seats in the heads of the cylinders, and rigid means operating independently with respect to each cylinder for maintaining said cylinders in required relationship with the housing.

HENRY P. T. VAN KEUREN.

Witnesses:
MAE HOFMANN,
JNO. P. CROASDALE.